US 10,365,361 B2

(12) United States Patent
Shi et al.

(10) Patent No.: US 10,365,361 B2
(45) Date of Patent: Jul. 30, 2019

(54) SYSTEM AND METHOD FOR DERIVING SPATIAL SEQUENCE OF MULTIPLE OBJECTS ON AN INTERACTIVE SURFACE

(71) Applicants: Zheng Shi, Beijing (CN); Zhengzheng Pan, Beijing (CN); Hanyin Ye, Beijing (CN)

(72) Inventors: Zheng Shi, Beijing (CN); Zhengzheng Pan, Beijing (CN); Hanyin Ye, Beijing (CN)

( * ) Notice: Subject to any disclaimer, the term of this patent is extended or adjusted under 35 U.S.C. 154(b) by 0 days.

(21) Appl. No.: 15/992,158

(22) Filed: May 29, 2018

(65) Prior Publication Data

US 2018/0275266 A1    Sep. 27, 2018

Related U.S. Application Data

(63) Continuation-in-part of application No. PCT/CN2016/108288, filed on Dec. 1, 2016.

(30) Foreign Application Priority Data

Dec. 1, 2015 (CN) .......................... 2015 1 0868242

(51) Int. Cl.
*G01S 13/75* (2006.01)
*G06K 7/10* (2006.01)
*A63F 9/00* (2006.01)

(52) U.S. Cl.
CPC ............ *G01S 13/75* (2013.01); *A63F 9/0073* (2013.01); *G06K 7/10099* (2013.01); *G06K 7/10118* (2013.01); *G06K 7/10198* (2013.01); *G06K 7/10366* (2013.01); *A63F 2009/0075* (2013.01); *G06K 7/10069* (2013.01); *G06K 7/10079* (2013.01)

(58) Field of Classification Search
CPC ........................... G01S 13/75; G06K 7/10366
USPC ........................................................ 340/10.1
See application file for complete search history.

(56) References Cited

U.S. PATENT DOCUMENTS

| 9,575,156 | B2 * | 2/2017 | Mkrtchyan | ........ G06K 7/10356 |
| 2010/0019885 | A1 | 1/2010 | Charles et al. | |
| 2011/0109442 | A1 | 5/2011 | Pavlov et al. | |
| 2013/0335199 | A1 * | 12/2013 | Jonely | ................ G06K 7/10207 |
| | | | | 340/10.5 |

FOREIGN PATENT DOCUMENTS

| CN | 101266641 | 9/2008 |
| CN | 102831451 | 12/2012 |

OTHER PUBLICATIONS

SIPO: International Search Report for PCT Application No. PCT/CN2016/108288 filed Dec. 1, 2016, dated Feb. 7, 2017.

* cited by examiner

*Primary Examiner* — Vernal U Brown

(57) ABSTRACT

The inductive/capacitive coupling technology and the radio frequency identification devices (RFID) technology are applied to analyze the relative position of multiple RFID tagged objects located within a finite three-dimensional space. The RFID tags of the objects are read by an antenna at a series of resonance frequencies, with an effective reading range of the antenna changing as the resonance frequency changes. The spatial sequence of the objects is derived based on the information of multiple sets of RFID tags in multiple readings. The technology can be applied to a variety of toys and teaching tools, such as the Tower of Hanoi game.

10 Claims, 4 Drawing Sheets

SYSTEM AND METHOD FOR DERIVING SPATIAL SEQUENCE OF MULTIPLE OBJECTS ON AN INTERACTIVE SURFACE

CROSS-REFERENCE TO RELATED APPLICATION

This application is a continuation in part of International Patent Application No. PCT/CN2016/108288, entitled "System and Method for Deriving Spatial Sequence of Multiple Objects on an Interactive Surface", filed on Dec. 1, 2016, which claims priority of Patent Application CN2015108682427, entitled "System for Deriving Spatial Sequence of Multiple Objects on an Interactive Surface", filed on Dec. 1, 2015. The entire disclosure of the above application is incorporated herein by reference.

TECHNICAL FIELD

The present invention relates to the field of electronic detecting technology, and in particular, to the application of the inductive/capacitive coupling technology as well as the radio frequency identification devices (RFID) technology. The system disclosed in the present invention provides a reliable solution to the analysis of the relative position of multiple objects located within a finite space, and can be applied to a variety of toys and teaching tools.

BACKGROUND

Nowadays, the application of the RFID technology is already relatively mature. Within a finite spatial range of effectively reading and writing, reading multiple RFID tags reliably at the same time isn't a technical bottleneck. However, due to the nature of the RFID technology, no reliable technologies are available to accurately derive the spatial sequence of multiple RFID tags within a three-dimensional space currently. In other words, prior arts can recognize the presence and the identities of multiple RFID tags and then read and write the tags, but can't derive the relative spatial relationships between and among these RFID tags or between the signal source and the RFID tags.

SUMMARY OF THE INVENTION

Aiming to solve the problems above, the present invention provides a system and the accompanying method for deriving spatial sequence of multiple objects on an interactive surface. The system includes an interactive surface and multiple physical objects. Each object is placed within a finite three-dimensional space on the interactive surface, and embedded with an RFID tag. The interactive surface further includes an RF module, an antenna, a host, an adjustable matching network, a channel switch, and an output module.

In accordance with one embodiment of the present invention, as per a predetermined method one, the host instructs the channel switch to change the parameters of the components of the adjustable matching network to generate a series of resonance frequencies. And the host instructs the antenna to read the RFID tags at the series of resonance frequencies, with an effective reading range of the antenna changing as the resonance frequency changes. The host receives information of multiple sets of RFID tags in multiple readings, and derives a spatial sequence of the objects placed on the interactive surface. According to a predetermined method two, the host provides the output signal or action through the output module.

As long as the change of the resonance frequency is reasonable, and with a simple algorithm applied, the spatial sequence of the multiple RFID tags relative to a reference point within the three-dimension space can be derived. The formula is:

$$f = \frac{1}{2\pi\sqrt{LC}}$$

wherein, f is the resonance frequency of the antenna, L is equivalent inductance value of the current RF channel, and C is equivalent capacitance value of the current RF channel. Once the parameters in the formula, such as L and C, are changed through the switch control signals transmitted by the host, a mismatch is created between the resonance frequency of the antenna and that of the RFID tags of the multiple objects, which corresponds to different effective ranges for reading the RFID tags.

In accordance with one embodiment of the present invention, the resonance frequency of reading the RFID tags embedded in the objects is in the high frequency range, with 13.56 MHz being the optimal value that corresponds to a maximal reading range.

In accordance with one embodiment of the present invention, the channel switch could be an analog switch, a multi-channel signal selector, an attenuator, or a circuit unit that can switch the state of the parameters of the components.

In accordance with one embodiment of the present invention, the component of the adjustable matching network might be an inductance, capacitance and resistance element.

In accordance with one embodiment of the present invention, the finite three-dimensional space refers to the space range of the RF module effectively reading the RFID tags.

Based on the existing RFID technology, the host, the channel switch and the adjustable matching network function together to adjust the RF parameters within the system, so as to change the effective reading range between the antenna and the objects for multiple times. In multiple attempts and adjustments, the host finally derives the spatial sequence of the objects within the space.

In accordance with one embodiment of the present invention, the system is applied to the Tower of Hanoi game.

The above solution can derive the spatial sequence of multiple RFID tags in a three-dimensional space steadily and reliably. This technology can be applied to a variety of products, industrial sectors and projects, providing the spatial analysis of multiple objects intelligently, inexpensively and in an energy-saving manner.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are only for exemplary embodiments of the present invention, and that a person of ordinary skill in the art may derive additional drawings without deviating from the principles of the present invention.

DETAILED DESCRIPTION OF THE INVENTION

Reference will now be made in detail to various embodiments of the invention illustrated in the accompanying drawings. While the invention will be described in conjunction with the embodiments, it will be understood that this is not intended to limit the scope of the invention to these specific embodiments. The invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

Figure 1:
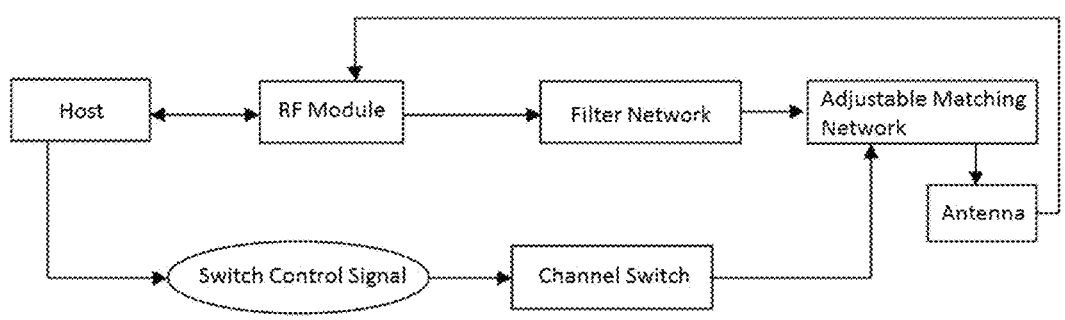
FIG. 1 is a schematic diagram illustrating the structure of the interactive surface in accordance with embodiment one of the present invention.
Figure 2:
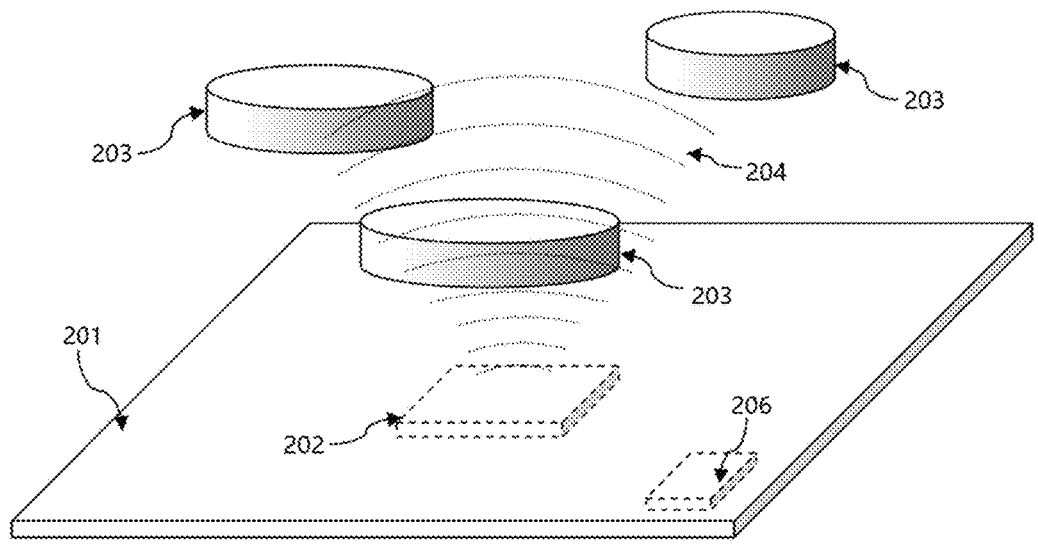
FIG. 2 is a schematic diagram illustrating the electromagnetic coupling between multiple objects within a three-dimensional space above the interactive surface and the interactive surface in accordance with one embodiment of the present invention.

The present invention discloses a system for deriving spatial sequence of multiple objects on an interactive surface, as shown in FIG. 2. The system includes an interactive surface 201, and multiple objects 203. Each of the objects 203 is placed within a finite three-dimensional space on the interactive surface 201 and embedded with an RFID tag. As shown in FIG. 1, the interactive surface 201 is embedded with an RF module (shown in FIG. 3), a filter network, an antenna (shown in FIG. 2), a host, an adjustable matching network, and a channel switch. The system further includes an output module 206, as shown in FIG. 2.

Figure 4:
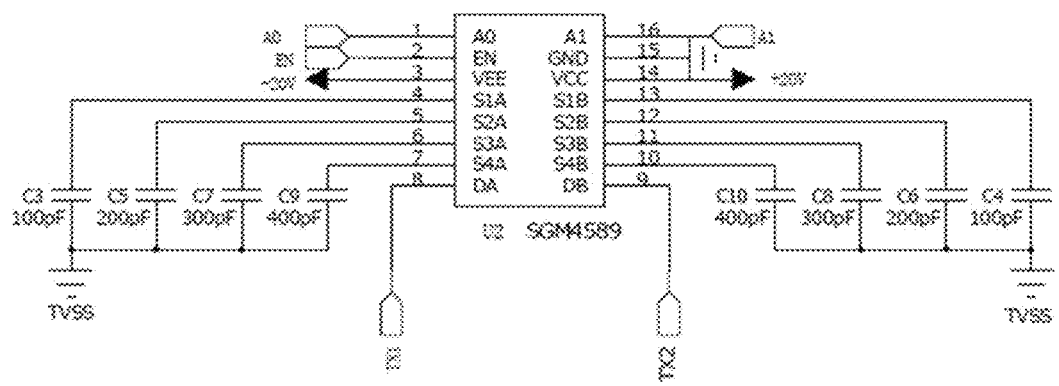
FIG. 4 is a schematic diagram illustrating the connection between the channel switch and the adjustable matching network in accordance with one embodiment of the present invention.

According to a predetermined method one, which could be a compiled program, the host instructs the channel switch to change the parameters of the components of the LCR (inductance, resistance, capacitance) circuit of the adjustable matching network (as shown in FIG. 4), so as to change the resonance frequency of the electromagnetic wave radiated by the adjustable matching network within the three-dimensional space. The host instructs the antenna to read RFID tags at a certain resonance frequency. As a result, the information of multiple sets of RFID tags in multiple readings, which generally includes the number and the identity of the RFID tags that have been read, is received by the host as the parameters of the components of the adjustable matching network have been changed for multiple times. And eventually the host derives a spatial sequence of all objects placed on the interactive surface.

Based on the spatial sequence, and according to a predetermined method two, such as a compiled program, the host provides the output signal or action through the output module 206.

The resonance frequency of reading the RFID tags embedded in an object is in the high frequency range, with 13.56 MHz being the optimal value that corresponds to a maximal range of reading.

As shown in FIG. 4, the channel switch could be an analog switch, a multi-channel signal selector, an attenuator, or a circuit unit that can switch the state of the parameters of the components.

The component of the adjustable matching network could be an inductance, capacitance, or resistance element.

The finite three-dimensional space refers to the space range where the inductor can generate electromagnetic coupling strong enough to be detected or the capacitor can generate capacitive coupling strong enough to be detected, i.e., the space range of the RF module effectively reading the RFID tags.

Figure 3:
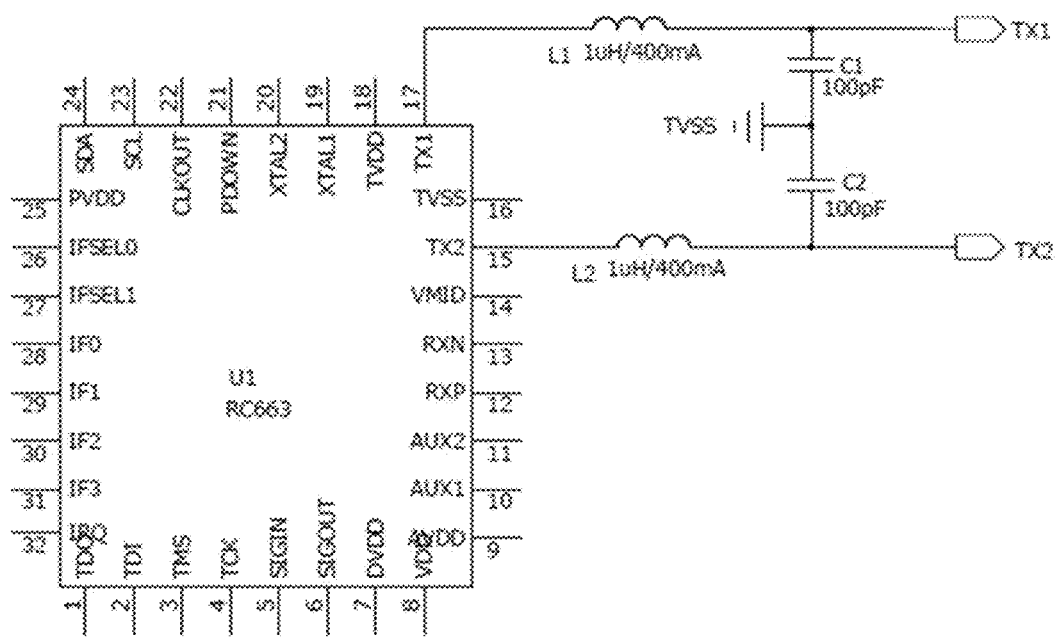
FIG. 3 is a diagram illustrating the chip of the RF module and the peripheral circuit in accordance with one embodiment of the present invention.
Figure 6:
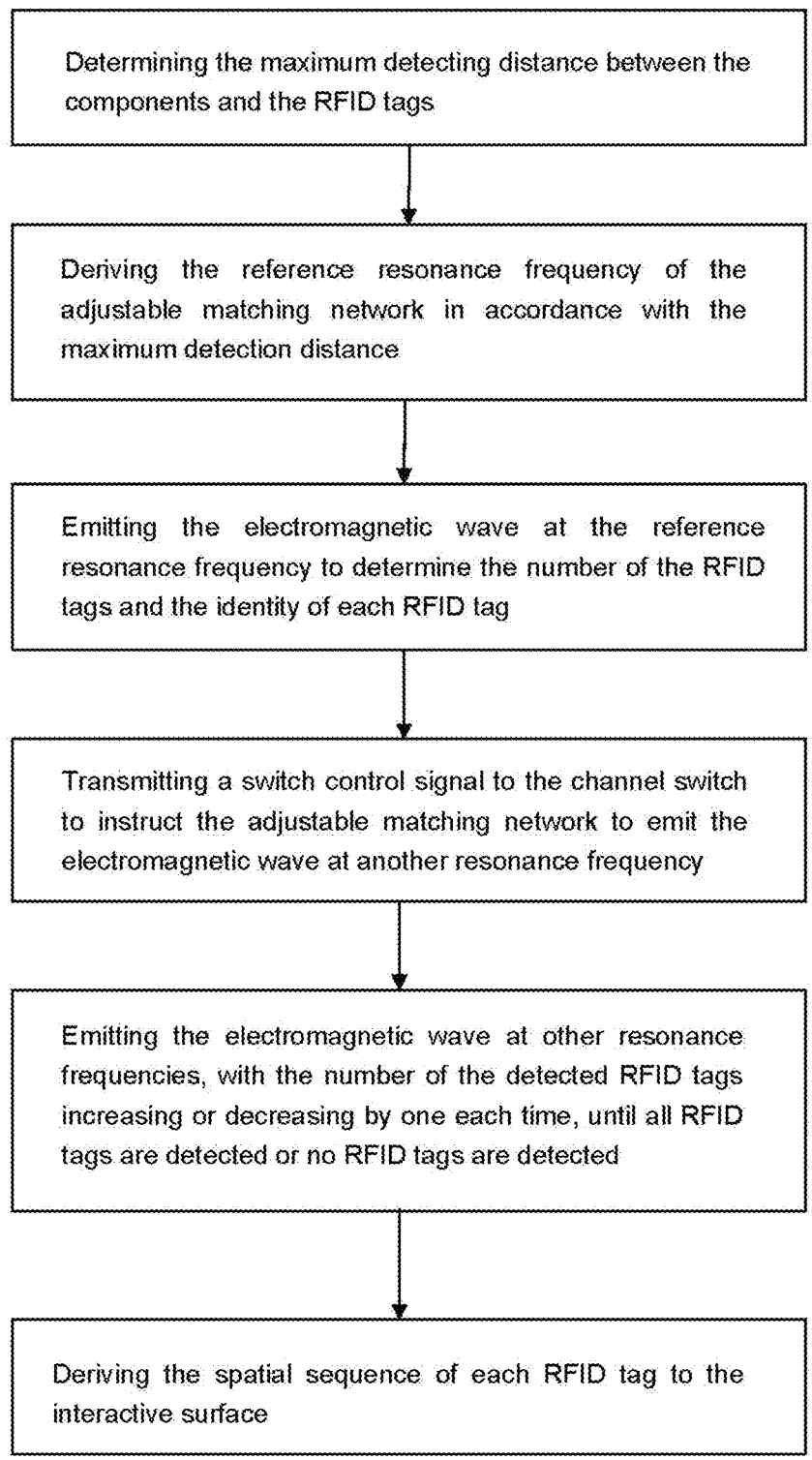
FIG. 6 is a schematic diagram illustrating the process flow of the predetermined method one in accordance with one embodiment of the present invention.

The process flow of the predetermined method one is shown in FIG. 6, as follows:

Step one: determining the maximum detecting distance between the components of the adjustable matching network and the RFID tags, based on the inherent physical properties of them;

Step two: deriving the reference resonance frequency of the adjustable matching network in accordance with the maximum detection distance, and emitting the electromagnetic wave 204 at the reference resonance frequency, by the antenna 202, to determine the number of the RFID tags and the identity of each RFID tag; thus, the total number of the objects and the identity of each object are determined in this manner;

Step three: transmitting a switch control signal to the channel switch to instruct the adjustable matching network to emit the electromagnetic wave 204 at another resonance frequency to multiple objects 203 through antenna 202 (as shown in FIG. 2); and once the electromagnetic wave 204 is induced by the RFID tag of objects 203, a feedback is produced and then received by the antenna 202 and then returned to the RF module (as shown in FIG. 3), and thus a new number of the RFID tags and the identity of each RFID tag are determined by the host, as shown FIG. 1;

Step four: repeating step three by emitting the electromagnetic wave at another resonance frequency, with the number of the detected RFID tags increasing or decreasing by one each time, until all RFID tags are detected or no RFID tags are detected;

Step five: deriving, by the host, the spatial sequence of each RFID tag to the interactive surface 201.

The functions of the main hardware in FIGS. 1-4 are as follows:

the host: configuring the RF module, and transmitting instructions and data; changing the parameters of the components of the adjustable matching network; running the algorithm, and providing the results;

the RF module: encoding the instructions or data sent from the host and modulating the codes to be emitted through RF signals; demodulating the received RF signal into digital signals, decoding, parsing protocols, restoring the signals to the original data and uploading the data to the host;

the filter network: filtering the modulated RF digital signals, and transmitting the modulated signals to the antenna in the carrier form at a single frequency;

the channel switch: switching the parameters of the components of the adjustable matching network from one state to another state;

the antenna: converting the RF energy into the magnetic energy and transmitting the energy; converting the magnetic energy induced by the RFID tags into the electric signals and transmitting the signals to the RF module;

the adjustable matching network: dynamically changing the parameters or a combination of the parameters of the components, such as inductance, capacitance and resistance elements, of the LCR circuit, so as to adjust the resonance frequency of the antenna, and thus to create a mismatch between the resonance frequency of the antenna and that of the RFID tags of the multiple objects 203 in a variety of degrees, which corresponds to different effective ranges for reading the RFID tags; as long as the parameters of the components are changed reasonably and the changes are matched with the corresponding parameters, the resolution and the maximum tolerance range needed to detect objects in a three-dimensional space can be achieved.

The parameters or a combination of the parameters of the components of the adjustable matching network, including a single inductance, capacitance or resistance element, or a combination of any two of the elements, or even a combination of three elements, can be changed or adjusted. For example, once two parameters, the inductance value and the capacitance value, which form a combination A of parameters, are changed manually or by the computer program in the host, a different resonance frequency is created. The antenna reads the RFID tags within the three-dimensional space at the new resonance frequency, and a set of RFID tags will be detected. And if the inductance value and the capacitance value are changed again, forming a combination B of parameters, another set of RFID tags will be detected at another resonance frequency. The process above could be repeated until the $N_{th}$ set of RFID tags are detected. In brief, the greater is the degree of the mismatch, the smaller is the effective reading range, and the closer is the detected object (as well as the RFID tags) to the antenna.

The working principle of the adjustable matching network is illustrated in the following embodiment, as shown in FIG. 3 and FIG. 4.

1. the correspondence between FIG. 1 and FIGS. 3-4 is as follows:

channel switch (in FIG. 1)<====>U2 (in FIG. 4);

adjustable matching network (in FIG. 1)<====>C3~C10 (in FIG. 4);

switch control signal (in FIG. 1)<====>A0, A1, EN (in FIG. 4);

filter network (in FIG. 1)<====>L1, L2, C1, C2 (in FIG. 3).

2. The components whose parameters need to be adjusted are C3, C5, C7, and C9 (corresponding to C4, C6, C8, and C10, respectively), and their capacitance values can be adjusted to any numbers if necessary.

3. The adjustment of the parameters of the components is artificially divided into the following five classes (X: arbitrary logic; H: logically high; L: logically low);

class 1: EN=0, A1=X, A0=X; equivalent parallel capacitance: 0 pF; reading-writing distance: $h_0$;

class 2: EN=1, A1=L, A0=L; equivalent parallel capacitance: 100 pF; reading-writing distance: $h_1$;

class 3: EN=1, A1=L, A0=H; equivalent parallel capacitance: 200 pF; reading-writing distance: $h_2$;

class 4: EN=1, A1=H, A0=L; equivalent parallel capacitance: 300 pF; reading-writing distance: $h_3$;

class 5: EN=1, A1=H, A0=H; equivalent parallel capacitance: 400 pF; reading-writing distance: $h_4$.

4. It is assumed that, initially, the resonance frequency of the antenna 202 and that of the RFID tag of the object 203 are both $f_0$;

$$f_0 = \frac{1}{2\pi\sqrt{LC_0}},$$

and the reading-writing distance is up to $h_0$;

a. if a capacitor of 100 pF is connected in parallel, the resonance frequency of the antenna 202 will become $f_1$:

$$f_1 = \frac{1}{2\pi\sqrt{L(C_0 + 100 \text{ pF} * 10^{-12})}}$$

and now a frequency deviation $\Delta f$ will be generated, and the value of $\Delta f$ represents the degree of mismatch between the antenna 202 and the RFID tags, i.e., the degree that the resonance frequency of the antenna 202 deviates from that of the RFID tags. The bigger is the mismatch, the more is the deviation between the two resonance frequencies. If the mismatch is eliminated, the two resonance frequencies will be the same. At this moment, the reading-writing distance has been changed to $h_1$;

b. similarly, if a capacitor of 200 pF is connected in parallel, the resonance frequency of the antenna 202 will become $f_1$:

$$f_2 = \frac{1}{2\pi\sqrt{L(C_0 + 200 \text{ pF} * 10^{-12})}},$$

and the reading-writing distance is now $h_2$;

c. with the process in steps a and b repeating, a spatial sequence of the read-write distance will be produced, i.e., $h_0$, $h_1$, $h_2$, $h_3$, $h_4$.

5. with the spatial sequence $h_0 \sim h_4$ corrected in multiple attempts, the RFID tags within the range of the electromagnetic induction field can be read one by one, or disappear one by one. Thus, the spatial sequence 202 of all objects 203 placed within the three-dimensional space relative to the antenna can be derived.

Figure 5:
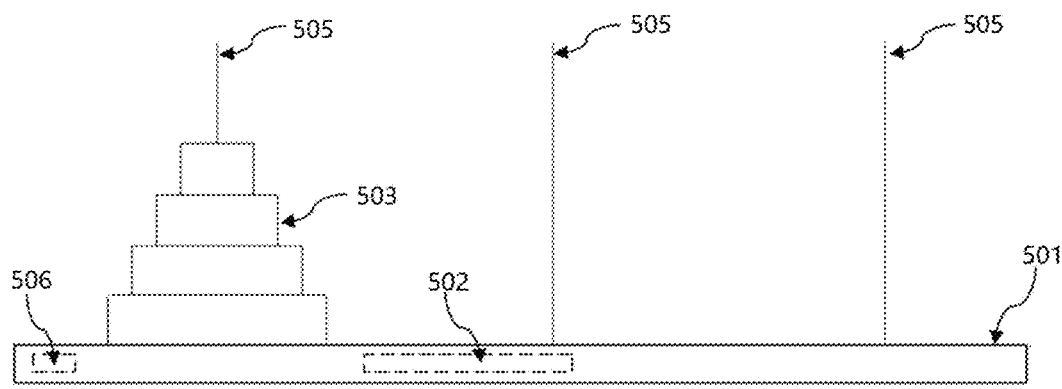
FIG. 5 is a schematic diagram illustrating the system for the Tower of Hanoi game in accordance with one embodiment of the present invention.

The present invention can be applied to the Tower of Hanoi game, as shown in FIG. 5.

Three insulation rods 505, the first rod, the second rod and the third rod, are placed on the interactive surface 501. Multiple objects 503, each with a hole, are stacked on one rod 505 in a predetermined order, and can only be moved in a certain sequence.

The output module 506 might be an audio device, a light or any other display device, separated from the interactive surface 501 and the multiple objects 503, or embedded in either the interactive surface 501 or the objects 503. As shown in FIG. 5, the output module 506 is embedded in the interactive surface 501, and thus it is in dotted lines.

Also shown in FIG. 5, the objects 503 are disks with a hole, and are placed in ascending order of size on one rod, the smallest at the top and thus farthest away from the interactive surface 501. The predetermined method two, the rules of the game compiled in software of the host, are as follows:

all disks are to be moved from the first rod to the third rod; only one disk can be moved each time; no disk may be placed on top of a smaller disk; a disk can be placed on the second rod or moved back to the first rod temporarily; the player with the fewest moves wins the game.

Different feedback will be provided to players by the output module 506, depending on whether or not the moves violate the rules of the game, and based on the overall performance of players. For example, once a disk is placed on top of a smaller disk, red lights will flash to alarm players, and some points may be deducted for penalty. And once a disk is placed on top of a bigger disk, positive feedback will be provided, e.g., green lights will flash.

During the game, the system detects the stacking order of the disks via the antenna 502, until all disks are correctly placed in ascending order of size on the third rod, with the smallest one at the top. The number of the moves of the disks for each player is recorded and finally displayed by the output module 506.

The invention claimed is:

1. A system for deriving spatial sequence of multiple objects on an interactive surface, comprising:
   an interactive surface embedded with an RF module, an antenna, a host, an adjustable matching network, and a channel switch;
   a plurality of objects placed within a finite three-dimensional space on the interactive surface, each object embedded with an RFID tag;
   wherein, the host instructs the channel switch to change the parameters of the components of the adjustable matching network to generate a series of resonance frequencies,
   and wherein, the host instructs the antenna to read RFID tags at the series of resonance frequencies, with an effective reading range of the antenna changing as the resonance frequency changes,
   and wherein, the host receives information of multiple sets of RFID tags in multiple readings, and derives a spatial sequence of the objects placed on the interactive surface.

2. The system of claim 1, wherein the resonance frequency of reading the RFID tags embedded in the objects is in the high frequency range, with 13.56 MHz being the optimal value that corresponds to a maximal reading range.

3. The system of claim 1, wherein the channel switch is selected from a group consisting of an analog switch, a multi-channel signal selector, an attenuator, and a circuit unit that can switch the state of the parameters of the components.

4. The system of claim 1, wherein the component of the adjustable matching network is selected from a group consisting of inductance, capacitance and resistance element.

5. The system of claim 1, wherein the finite three-dimensional space refers to the space range of the RF module effectively reading the RFID tags.

6. A method for deriving spatial sequence of multiple objects on an interactive surface, comprising:
   placing a plurality of objects within a finite three-dimensional space on an interactive surface embedded with an RF module, an antenna, a host, an adjustable matching network, and a channel switch, and wherein each object is embedded with an RFID tag;
   instructing, by the host, the channel switch to change the parameters of the components of the adjustable matching network to generate a series of resonance frequencies;
   instructing, by the host, the antenna to read RFID tags at the series of resonance frequencies, with the effective reading range of the antenna changing as the resonance frequency changes;
   receiving, by the host, information of multiple sets of RFID tags in multiple readings;
   deriving, by the host, a spatial sequence of the objects placed on the interactive surface.

7. The method of claim 6, wherein the resonance frequency of reading the RFID tags embedded in the objects is in the high frequency range, with 13.56 MHz being the optimal value that corresponds to a maximal reading range.

8. The method of claim 6, wherein the channel switch is selected from a group consisting of an analog switch, a multi-channel signal selector, an attenuator, and a circuit unit that can switch the state of the parameters of the components.

9. The method of claim 6, wherein the component of the adjustable matching network is selected from a group consisting of inductance, capacitance and resistance element.

10. The method of claim 6, wherein the finite three-dimensional space refers to the space range of the RF module effectively reading the RFID tags.

* * * * *